United States Patent [19]
Allwine, Jr.

[11] Patent Number: 5,313,159
[45] Date of Patent: May 17, 1994

[54] MAGNETIC ENCODER WITH COMPOSITE MAGNET

[76] Inventor: Elmer C. Allwine, Jr., 450 Harvard Ave. No. 9-C, Santa Clara, Calif. 95051

[21] Appl. No.: 982,204

[22] Filed: Nov. 25, 1992

Related U.S. Application Data

[62] Division of Ser. No. 784,207, Oct. 28, 1991.

[51] Int. Cl.$^5$ .................. G01B 7/30; G01P 3/487; H01F 7/02; H03M 1/00
[52] U.S. Cl. .................. 324/207.2; 310/156; 324/174; 335/306; 341/15
[58] Field of Search .................. 324/173, 174, 207.20, 324/207.21, 207.22, 207.23, 207.24, 207.25, 228, 251, 252; 235/493; 335/302, 306; 73/519; 310/156, 68 B; 340/671; 341/15

[56] References Cited

U.S. PATENT DOCUMENTS

| | | | |
|---|---|---|---|
| 2,615,227 | 10/1952 | Hornik | 24/230 |
| 3,317,829 | 5/1967 | Kuhrt et al. | 324/174 X |
| 3,558,941 | 1/1971 | Brebbia et al. | 310/156 X |
| 3,633,138 | 1/1972 | Baermann | 335/217 |
| 3,742,243 | 6/1973 | Gamble | 324/174 X |
| 4,086,519 | 4/1978 | Persson | 318/254 |
| 4,274,053 | 6/1981 | Ito et al. | 324/174 |
| 4,399,595 | 8/1983 | Yoon et al. | 24/201 |
| 4,499,420 | 2/1985 | Shiraki et al. | 324/174 |
| 4,528,473 | 7/1985 | Tezuka | 310/256 |
| 4,642,496 | 2/1987 | Kerviel et al. | 324/207.2 |
| 4,941,236 | 7/1990 | Sherman et al. | 24/303 |

FOREIGN PATENT DOCUMENTS

| | | |
|---|---|---|
| 2847203 | 5/1979 | Fed. Rep. of Germany . |
| 52-3969 | 12/1977 | Japan ......... 7/02 |
| 6603196 | 9/1966 | Netherlands . |
| 1617548A1 | 12/1990 | U.S.S.R. . |
| 893986 | 4/1962 | United Kingdom ......... 324/174 |

OTHER PUBLICATIONS

Clark, G.A.; Rotary Tachometer/Encoder, IBM Tech. Disc. Bull. vol. 18 No. 9 Feb. 1976, p. 2787.

*Primary Examiner*—Gerard R. Strecker
*Attorney, Agent, or Firm*—Skjerven, Morrill MacPherson Franklin & Friel

[57] ABSTRACT

The composite magnet of the present invention comprises two pieces of permanent magnet material formed into a complementary pattern of holes and projections. The two pieces are magnetized in opposite axial directions. The two pieces, magnetized in this manner, when placed together form an interlocking single element which exhibits a magnetic pattern of north-south poles which matches the pattern of holes and projections. In this manner, the composite magnet appears as a single permanent magnet, exhibiting a sharp, strong, and well-defined magnetic pattern. In accordance with the present invention, the composite magnet may be used in many applications including, but not limited to encoders, one of which is described in detail.

32 Claims, 7 Drawing Sheets

MAGNETIC ENCODER WITH COMPOSITE MAGNET

This application is a division of application Ser. No. 07/784,207, filed Oct. 28, 1991.

FIELD OF THE INVENTION

The present invention relates to a magnet having multiple north-south poles, and in particular to a composite magnet constructed of two interlocking pieces, each piece having complementary apertures and protrusions to form the multiple north-south poles. The present invention further relates to an encoder using the above-described magnet.

BACKGROUND OF THE INVENTION

Constructing a magnet with multiple north-south poles is well-known in the art. For example, U.S. Pat. No. 3,127,544 issued to Blume, Jr., discloses an apparatus for magnetizing permanent magnet materials to form band-like poles. Blume discloses an apparatus comprised of an upper and a lower assembly. Each assembly has a north primary pole piece, a south primary pole piece and an electromagnetic coil which establishes a magnetic potential difference between the primary pole pieces. These two assemblies, as their electro-magnets are activated, form alternate north-south magnetic poles on magnetic material passed between the assemblies. However, using this configuration, the north-south poles are not well-defined. This lack of definition is caused by a phenomena referred to as a "Bloch wall". When a "Bloch wall" occurs, the transition from one polarity to another is accompanied by a decrease in the magnetic field and a gradual switching from north to south and from south to north poles. This transition requires a finite distance through the material in which to occur so as to complete the switch. Therefore, the distance associated with the polarity switch fails to have well-defined poles.

Another prior art multi-pole magnet, U.S. Pat. No. 4,513,216 issued to Mueller, teaches a multi-pole rotor having its multiple north-south fields on its circumference. Mueller discloses a rotor having a minimum of three pieces, two of which are crown gears and one of which is a ferrous ring which completes a magnetic circuit on the internal side. Depending upon the cylindrical height of the particular rotor, Mueller uses spacer material, referred to as pole carriers, for structural strength. Hence, Mueller's assembly consists of many parts which present considerable problems in manufacturing, particularly significantly increasing material and labor costs.

Therefore, a need arises for a magnet which is easily magnetized, having a minimum number of pieces and exhibiting multi-poles which are well-defined.

Many types of encoders, including optical, mechanical, and magnetic, are also well-known in the art. Optical encoders provide high resolution, but have the disadvantages of high cost and the requirement of a clean working environment. Mechanical encoders are generally low cost items, but have only fair resolution and must also be operated in a clean environment for optimal performance. In contrast, magnetic encoders are not only constructed out of low cost material, but also perform under hostile environmental conditions.

However, present magnetic encoders, specifically dynamic magnetic encoders, are constructed with ferrous gear teeth or any high permeable metal (such as steel) protrusions. (Dynamic encoders require movement to decode, i.e. when motion ceases so does the output signal.) The size, i.e. thickness, of the teeth or protrusions of the dynamic, incremental magnetic encoder severely limits the resolution of the system. These same teeth or protrusions create numerous manufacturing difficulties including mechanical alignment problems and increased assembly cost. Other magnetic encoders currently used, for example static magnetic encoders which may transmit information with or without movement, have magnets constructed from a solid piece, thereby suffering from the same problem of pole definition described above for Blume.

Furthermore, as noted above, both of the above presently used magnetic encoders are incremental encoders, i.e. provide only a relative count with respect to an index point, which considerably limits their use.

Therefore, a need arises for an encoder which is low cost, operates in a hostile environment, and has a medium resolution. A further need arises for an absolute encoder which, unlike an incremental encoder, provides an accurate readout regardless of position, i.e. no index position is required.

SUMMARY OF THE INVENTION

In accordance with the present invention, a composite magnet comprises two pieces of permanent magnet material, each piece having a complementary pattern of holes and/or projections. These two pieces are magnetized in opposite axial directions. Thus, the two pieces, when mated, form an interlocking single element which exhibits a magnetic pattern of north and south poles matching the pattern of apertures and projections. In this manner, the composite magnet appears as a single permanent magnet, exhibiting a sharp, strong, and well-defined magnetic pattern. In one embodiment, the projection on one piece has a height which is approximately equal to the depth of its corresponding aperture on the other piece. Thus, the composite magnet has a flush outer surface which expands possible applications for the magnet.

This composite magnet may be used in many applications including encoders. In the encoder application described, the north-south pole pattern of the composite magnet passes above and, in close proximity to, magnetic flux detection means. The detection means, activated or deactivated by the north-south pole pattern, convert the mechanical position of the composite magnet to a digital output signal which is decoded by the control electronics.

DETAILED DESCRIPTION OF THE DRAWINGS

In accordance with the present invention, two pieces of permanent magnetic material are formed with protrusions and/or apertures which facilitate joining of the two pieces. The two pieces are magnetized in opposite axial directions. In this manner, the two pieces, when joined together, form a composite magnet, thereby significantly reducing manufacturing expense and, additionally, providing the advantage of well-defined north-south poles.

Figure 1A:
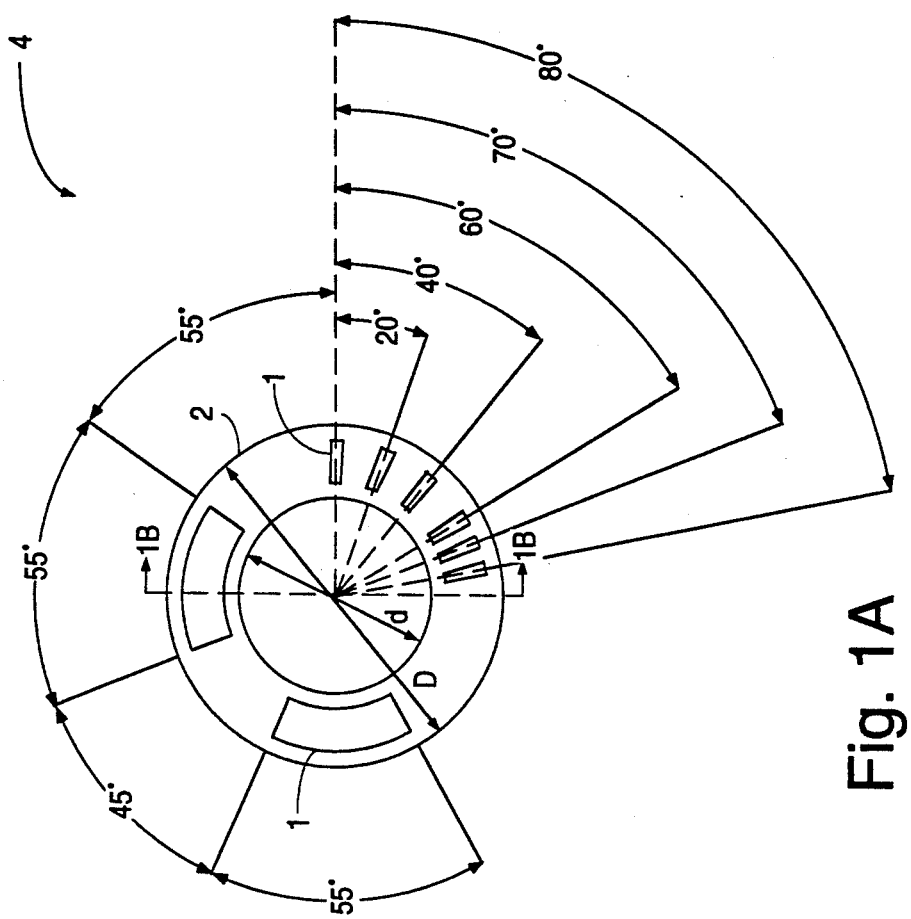
FIGS. 1A and 1B illustrate one-half of the composite magnet having projections on its surface.
Figure 1B:
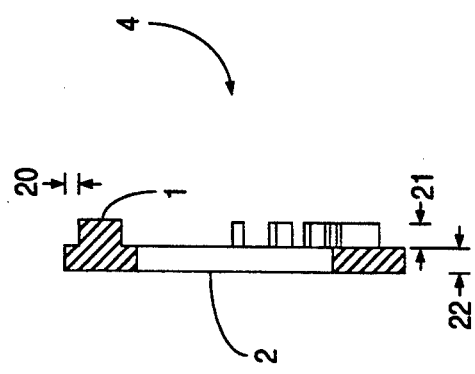
Figure 2A:
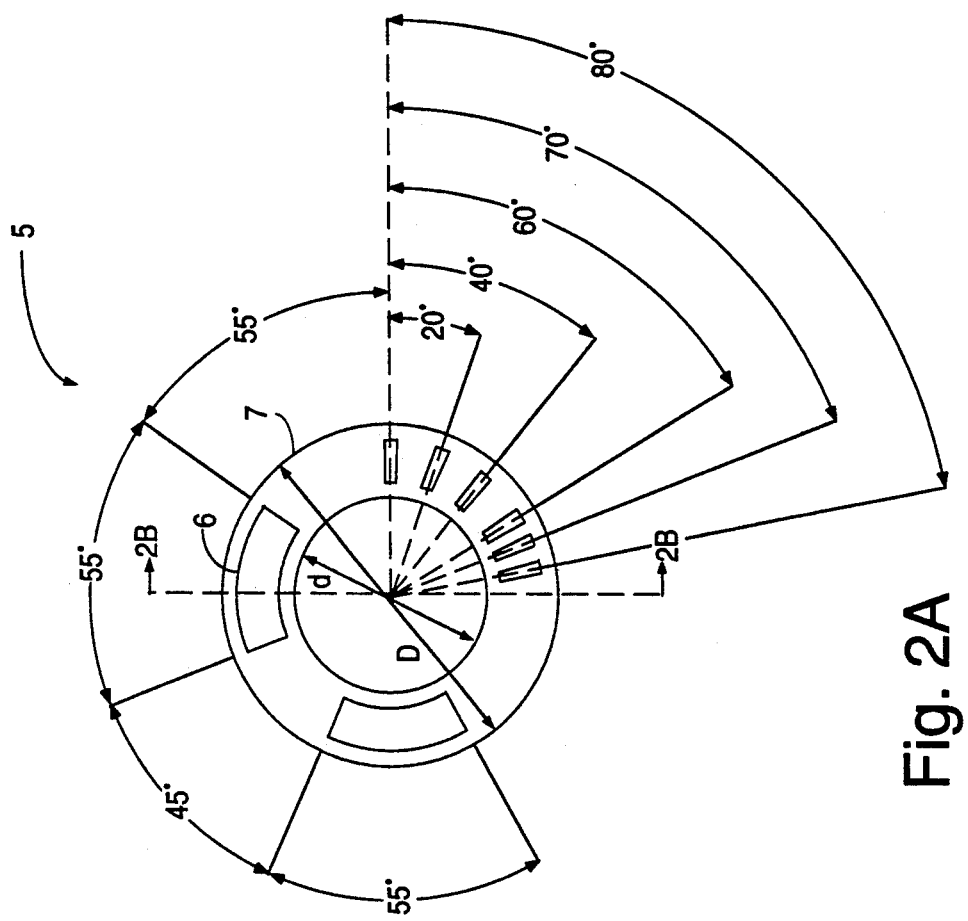
FIGS. 2A and 2B show complementary half of the composite magnet shown in FIG. 1 which has apertures in its surface.
Figure 2B:
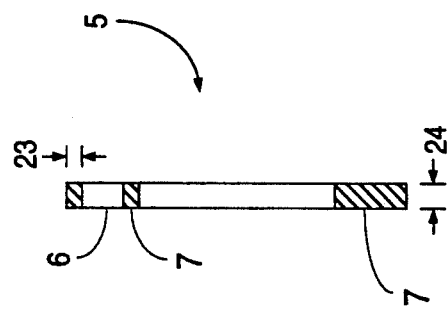

FIGS. 1A, 1B, 2A, and 2B illustrate one embodiment of the present invention in which each piece of the composite magnet either has projections or apertures. FIG. 1A illustrates a planar view of a magnet 4 which has protrusions 1 formed integrally with a structural member 2. FIG. 1B shows a cross-section of magnet 4 shown in FIG. 1A. FIG. 2A illustrates in planar view the complementary piece, a magnet 5 of the composite magnet. Magnet 5, in contrast to magnet 4, has apertures 6 which extend through a structural member 7. FIG. 2B shows a cross-section of magnet 5. Magnets 4 and 5 have the following dimensions as referenced in FIGS. 1B and 2B: 20=0.07 inches (0.178 cm), 21=0.08 inches (0.203 cm), 22=0.08 inches (0.203 cm), 23=0.07 inches (0.178 cm), and 24=0.09 inches (0.203 cm).

Each projection 1 found on magnet 4 shown in FIGS. 1A and 1B matches an aperture 6 formed on magnet 5 shown in FIG. 2A and 2B. Hence, to join magnet 4 with magnet 5, each protrusion 1 mates with its corresponding aperture 6. Because each half of the composite magnet, magnet 4 or magnet 5, is magnetized in an opposite axial direction to the other half (as will be described later in reference to FIG. 6), complete saturation is possible, i.e. a particular pole is homogeneously established at a particular strength throughout the whole surface. In this manner, when magnet 4 is joined to magnet 5, the transition region from north to south poles, and vice versa (described above as the "Bloch wall" effect) is virtually eliminated, thereby providing extremely well-defined poles.

Projections 1 have the same depth as apertures 6. Hence, when magnet 4 and magnet 5 are joined, the outer surface of the composite magnet is flush. In this manner, the present invention solves the problem of mechanical alignment experienced in the prior art, thereby expanding possible applications for the composite magnet.

Figure 3A:
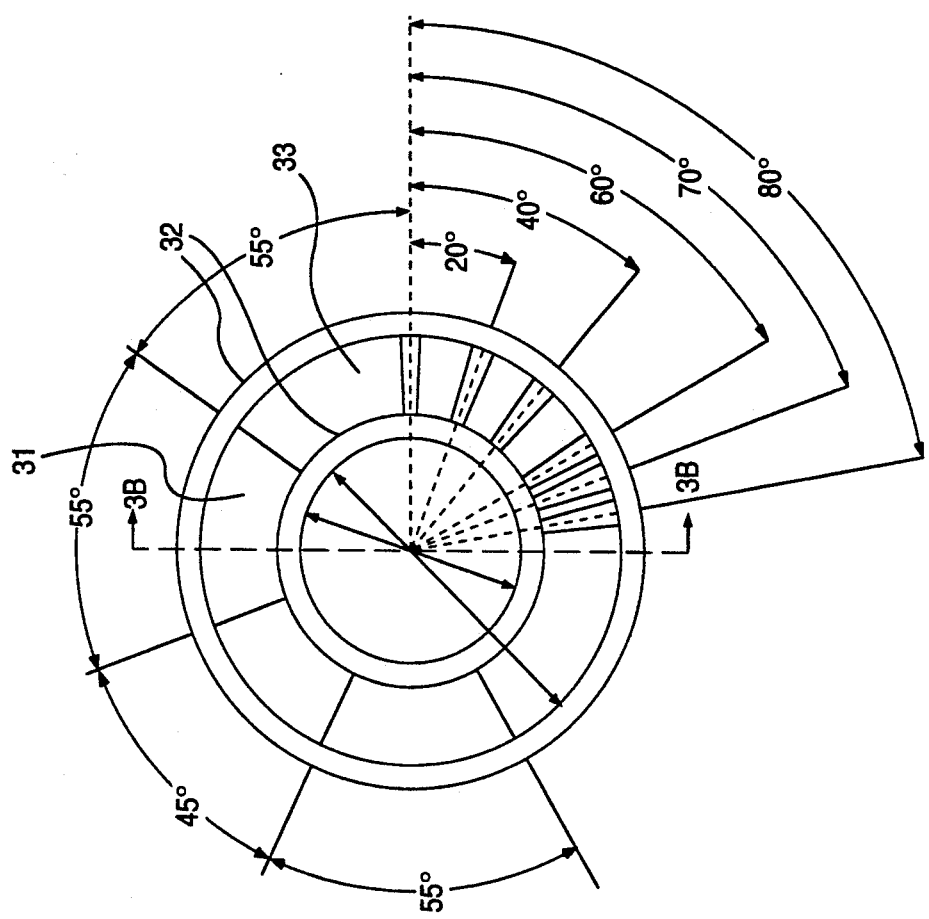
FIGS. 3A and 3B illustrate another embodiment of the present invention in which one-half of the composite magnet comprises both projections and apertures.
Figure 3B:
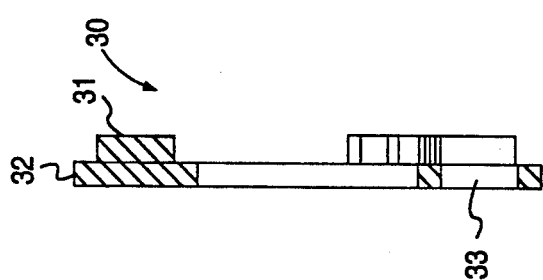
Figure 4A:
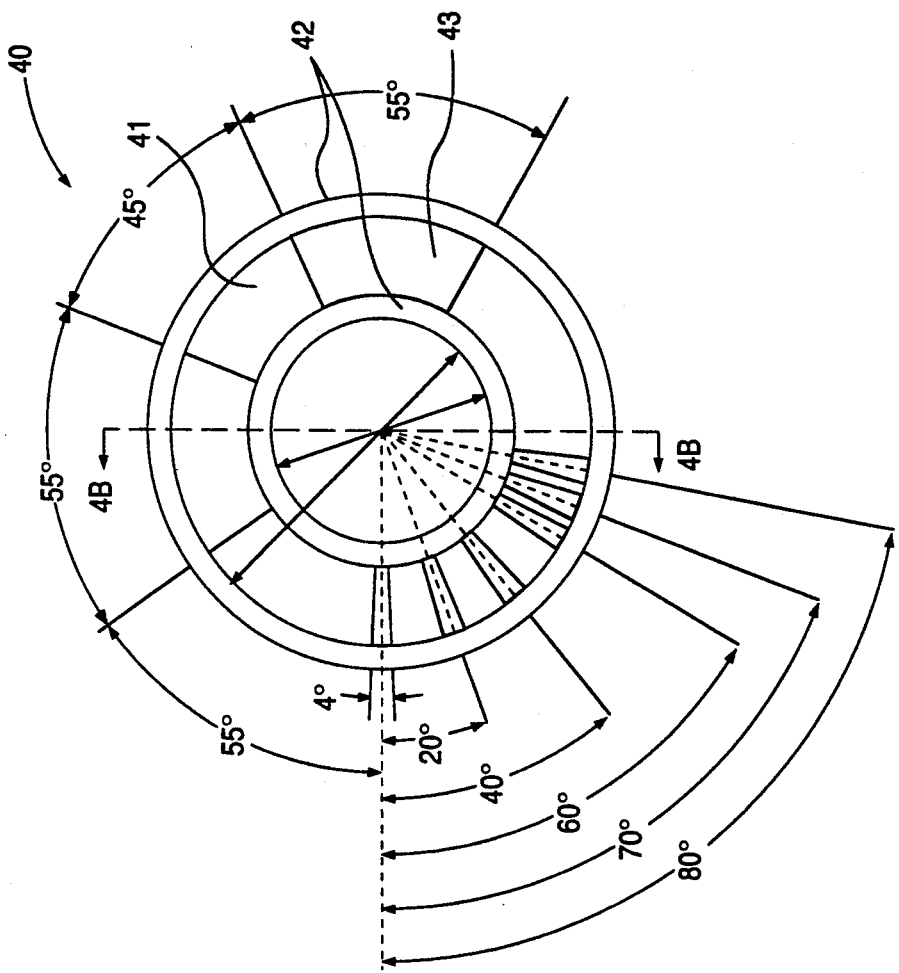
FIGS. 4A and 4B show the complementary half of the composite magnet shown in FIG. 3.
Figure 4B:
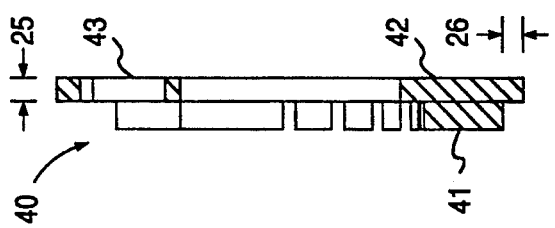

FIGS. 3B, 4A and 4B illustrate a composite magnet including two pieces which each have projections and apertures. FIG. 3A shows one embodiment of the present invention in which magnet 30 has protrusions 31, structural members 32, and apertures 33. FIG. 3B shows magnet 30 in cross-section. FIG. 4A illustrates the complementary half of magnet 30. Magnet 40, as seen in FIG. 4A, comprises projections 41, structural members 42, and apertures 43. FIG. 4B shows magnet 40 in cross-section. Magnet 30 mates with magnet 40 to form the composite magnet. Magnet 40 has the following dimensions as referenced in FIG. 4B: 25=0.08 inches (0.203 cm) and 25=0.069 inches (0.175 cm).

Figure 6:
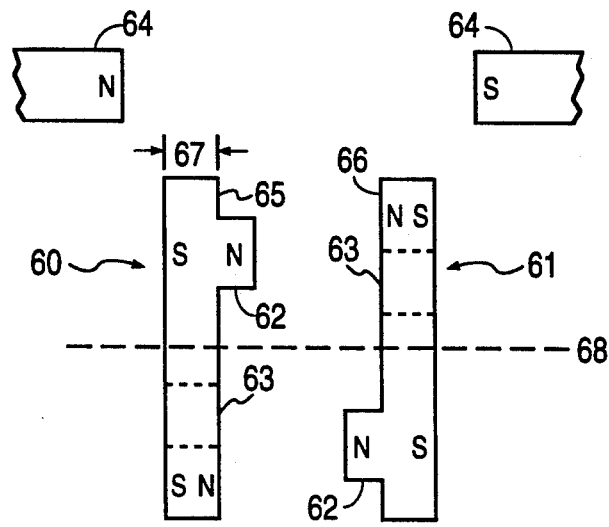
FIG. 6 shows the magnetizing process for the composite magnet pieces.

The magnetizing of the pieces which comprise the composite magnet is shown in FIG. 6. As shown in FIG. 6, pieces 60 and 61 both have apertures 63 and projections 62. North and south poles are established on pieces 60 and 61 using conventional methods, such as magnetizing by two pole pieces 64. Note that depending upon the orientation of pieces 60 and 61 between pole pieces 64, the two pieces may be physically magnetized at the same time. Because pieces 60 and 61 are magnetized in opposite axial directions, as indicated in FIG. 6, when piece (now magnet) 60 nears piece (now magnet) 61 there is an initial repulsion due to the fact that the respective north poles of each magnet are getting closer.

However, once a projection 62 is introduced into an aperture 63, the attraction between the north and the south poles of the other magnet draws magnets 60 and 61 together. Because of the configuration of mating pieces 60 and 61, a slight repulsion exists between surface 65 of magnet 60 and surface 66 of magnet 61. Although the attractive forces mentioned above are much greater than these repulsive forces, a fast-setting bonding agent may be used on the mating surfaces of magnets 60 and 61 to ensure no gaps are formed after joining of the two magnets. The strong bond between magnets 60 and 61 forms the composite magnet. In this manner, the composite magnet acts as a single permanent magnet exhibiting a magnetic pattern of north-south poles matching the pattern of projections and apertures. Note that the above-described method of magnetizing results in axial north-south poles, i.e. the poles are positioned about axis 68, not radially spreading from a common center. This magnetic pattern comprises the "encoding" of the composite magnet and will be described in detail in reference to FIG. 5.

The size of the protrusions and apertures as illustrated in FIGS. 1-4 varies, depending on the particular application which the composite magnet is used. Manufacturing of the complementary halves of the composite magnet is accomplished using conventional machining or injection molding processes. Preferred materials for making the composite magnet include, but are not limited to: barium ferrite in plastic form, for example 3M Brand Magnet Material 1060-1062; for higher energy product, neodymium boron in plastic form, sold by Tengam under the trade-name "NeoComp"; rare-earth materials, such as samarium cobalt, if expense warrants their usage; or any moldable ceramic grades of material. Although the above embodiments illustrate a composite magnet in the shape of a disc, any shape appropriate to the intended application may be used. In other words, the composite magnet itself is geometrically independent.

In accordance with the present invention, the composite magnet may be used in many applications including, but not limited to: encoders, tachometers, motors, generators, sensors, magnetic couplers, gyroscopes, torque measurement devices, and linear actuators. One of the above applications for a composite magnet, use in an encoder, is now described in further detail.

In general, an encoder is simply a device used in feedback systems which converts one type of information to another type of information. For example, in the application described in detail below, a motor drives a cam shaft which determines a gear position of a vehicle. The cam shaft is coupled to the encoder. This encoder then converts the "position" of the cam shaft into an electrical signal (i.e., a digital binary word) which is "read" by a system controller and used to "turn-on" or "turn-off" the motor at the proper position.

Figure 7:
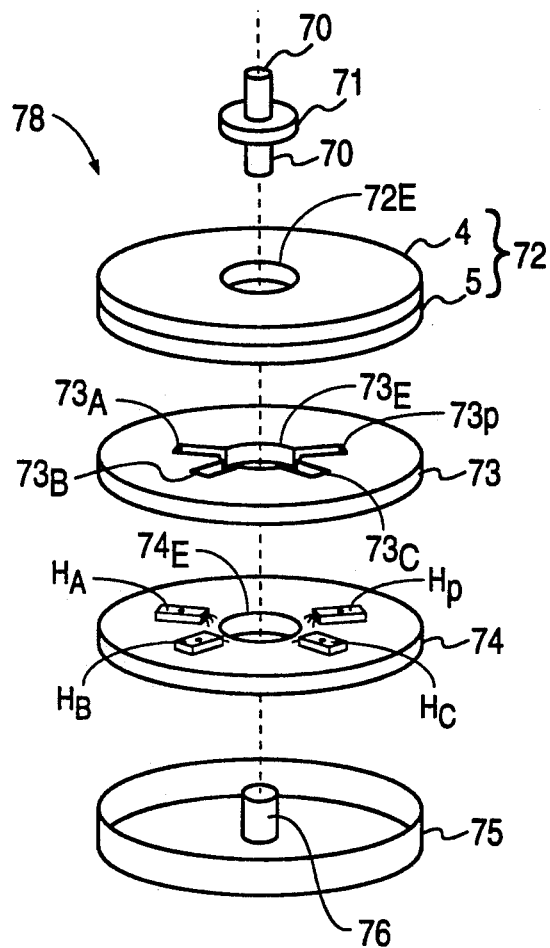
FIG. 7 illustrates an exploded view of one embodiment of a magnetic encoder using a composite magnet.

Referring to FIG. 7, shaft 70 of encoder 78 is coupled to a cam shaft (not shown). Therefore, rotation of shaft 70 to a particular angle corresponds to a predetermined cam angle which determines a designated gear position, i.e., 2-wheel high, 4-wheel high, 4-wheel low, etc. "4-wheel" or "2-wheel" designates whether the motor is directly driving all four wheels or whether only two wheels are being driven. "High" or "low" refers to different gear ratios. Typically, "high" is used for normal highway conditions and "low" is used for more adverse conditions, i.e. climbing and off-road conditions. Disc 71, which is formed integrally with shaft 70, is coupled to composite magnet 72 by conventional methods, such as gluing or forming mating projections on the circumference of disc 71 and the, hole 72E of composite magnet 72. Note that composite magnet 72 comprises pieces 4 and 5 as shown in FIGS. 1A and 2A respectively. Therefore, as shaft 70 rotates through an angle, the composite magnet 72 also rotates. In this embodiment, composite magnet 72 is constructed out of 3M Brand Magnetic Material 1062 (mentioned previously). The magnetic pattern (not shown) encoded as the north and south poles on the composite magnet 72 passes above four "Hall-Effect" integrated circuit sensors (hereinafter Hall sensors $H_A$, $H_B$, $H_C$, and $H_p$) mounted on the P.C. board 74. Hall sensors are well known to those in the art and, therefore, are not explained in further detail. In this embodiment, UGN-3120/u Hall sensors, manufactured by Spraque (now Allegro), are used. Back-iron 73, positioned between P.C. board 74 and composite magnet 72, has slots $73_A$, $73_B$, $73_C$, and $73_p$ to allow Hall sensors $H_A$, $H_B$, $H_C$, and $H_p$ to be in close proximity with composite magnet 72. In one embodiment, Hall sensors $H_A$, $H_B$, $H_C$, and $H_p$ are flush with the top surface of back-iron 73. An aperture $73_E$ in back-iron 73 permits shaft 70 to rotate freely therein. Back-iron 73 is typically constructed from low carbon steel which facilitates magnetic circuit flux return. This magnetic circuit flux return is particularly helpful for inexpensive, low-end Hall sensors. Higher quality Hall sensors do not require back-iron 73. Shaft 70 penetrates hole 72E of composite magnet 72, hole 73E of back-iron 73, and hole 74E of PC board 74, and fits into bearing cup 76 formed on holder 75. Back-iron 73 and PC board 74 remain stationary, positioned by holder 75, while composite magnet 72 rotates freely due to shaft 71. Note PC board 74 and back-iron 73 may be glued into holder 75.

For proper activating, composite magnet 72 is positioned at a predetermined distance above Hall sensors $H_A$, $H_B$, $H_C$, and $H_p$. In this embodiment, the predetermined distance is 10/1000 inches (0.010). Hall sensors $H_A$, $H_B$, $H_C$, and $H_p$, activated or deactivated by the north-south poles, respectively, on composite magnet 72, either "switch-on", allowing current to flow, or "switch-off", not allowing current to flow. The output signals of Hall sensors $H_A$, $H_B$, and $H_C$ indicating "ON" or "OFF" states read in combination, comprise a 3-digit binary word (described in further detail later) which conveys the "relative position" of shaft 70 to the control electronics (not shown). The output signal of the fourth Hall device, $H_p$, represents the "exact desired position" of the cam shaft (not shown). In an "N" bit digital word, $2^N$ combinations are possible. The output signals from Hall sensors $H_A$, $H_B$, and $H_C$ comprise a 3-bit word. Therefore, $2^3$ or 8 possible words can be realized. These words determine a relative cam position. This particular embodiment, however, utilizes only 6 out of the 8 possible cam positions. The fourth line, $H_p$, serves as an "absolute" position mark. By "reading" the output signals from Hall sensors $H_A$, $H_B$, and $H_C$ (the binary word) and the output signal from Hall sensor $H_p$ (position indicator) via interconnecting traces (not shown) on the bottom of PC board 74, the control electronics (not shown) "knows" when to "turn-off" or stop the motor which drives the cam shaft. In other words, the motor continues driving the cam shaft until the control electronics, receiving the signal from Hall sensor Hp, tells the motor to stop at that position. The above sequence is repeated when a new shift position is desired.

The composite magnet 72 used for this encoder application is illustrated in detail in FIGS. 1 and 2. Associated angles of the projections and apertures are indicated on those figures. The inner diameter d is approximately 0.8" (2.032 cm) while the outer diameter D is 1.4" (3.556 cm). As shown in FIGS. 1B and 2B, the thickness of the composite magnet is approximately 0.16" (0.406 cm).

The encoding of composite magnet 72 follows the process described in reference to FIG. 6, i.e. magnetizing between two pole pieces. The north-south pole pattern formed by the projections and apertures is the encoded portion of composite magnet 72. In this embodiment, the projections are south poles where the surface area between apertures on the side opposite the projections are north poles.

Figure 8:
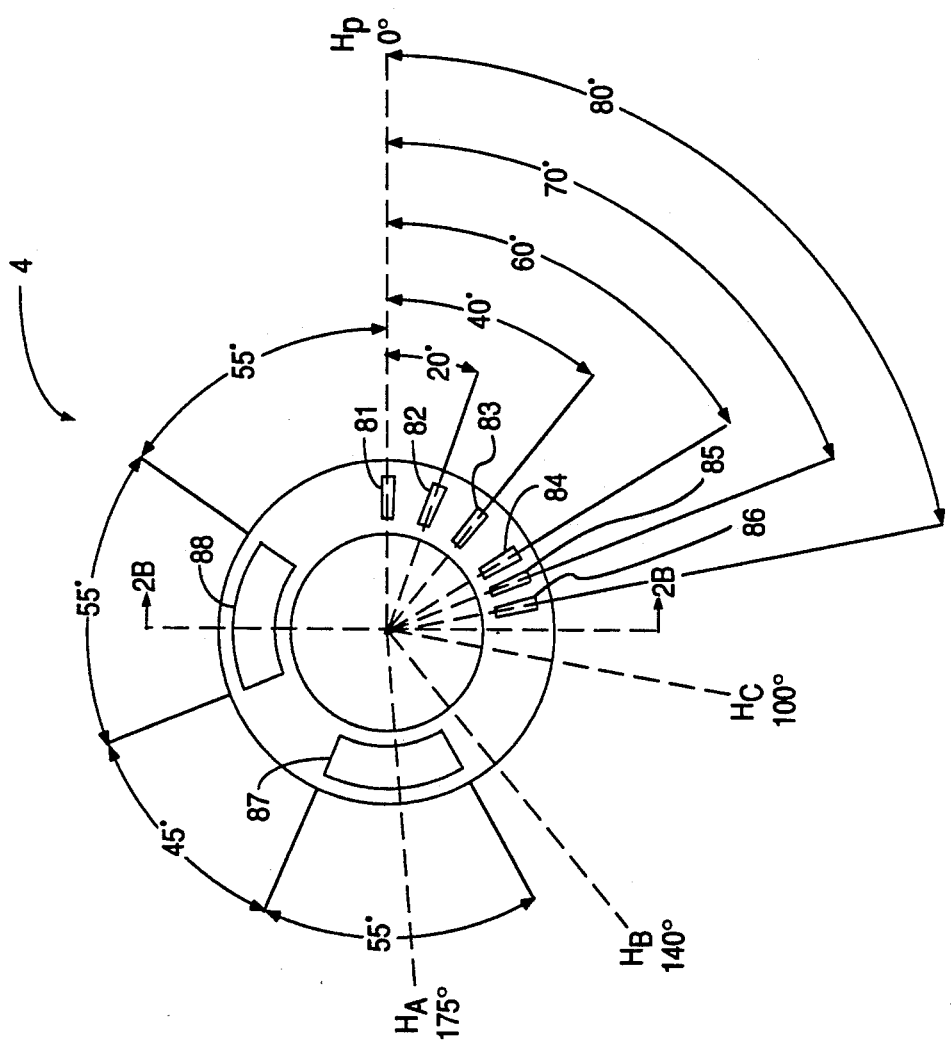
FIG. 8 shows one embodiment of an encoder in accordance with the present invention positioned relative to a plurality of Hall sensors.

Referring now to FIG. 8 which illustrates further details of composite magnet 72, south poles 81-86 are sized to be 4° in angular width for the above-described encoder application (see also FIG. 1A). South poles 87 and 88 are 55° in angular width. South poles 81-88 are positioned relative to the zero degree (0°) axis as shown in FIG. 8 (also seen in FIG. 1A). Hall sensor $H_p$ is located on the zero degree (0°) axis and serves as an absolute position indicator. Hall sensors $H_A$, $H_B$, and $H_C$ are positioned at approximately 175°, 140°, and 100°, respectively, and serve to determine the relative position of composite magnet 72 (see FIG. 7).

The four Hall sensors $H_A$, $H_B$, $H_C$, and $H_p$ convert the position of south poles 81-88 of composite magnet 80 into digital information to be decoded by the control electronics (not shown). As composite magnet 80 rotates counterclockwise with respect to the zero axis of FIG. 8, south poles 81-88, pass above, and in close proximity to the stationary Hall sensors $H_A$, $H_B$, $H_C$, and $H_p$. A south pole of sufficient "flux density" through any Hall sensor causes the output transistor switch in the integrated circuit of the Hall sensor to "turn on", thereby providing a flow of current. This flow of current equates to a "digital low" condition. Conversely, when the north pole area, i.e. the area between south poles 81-88, is above, and in close proximity to the Hall sensors, the output transistor "turns off", thereby stopping the flow of current. This lack of current equates to a "digital high" condition.

Figure 5:
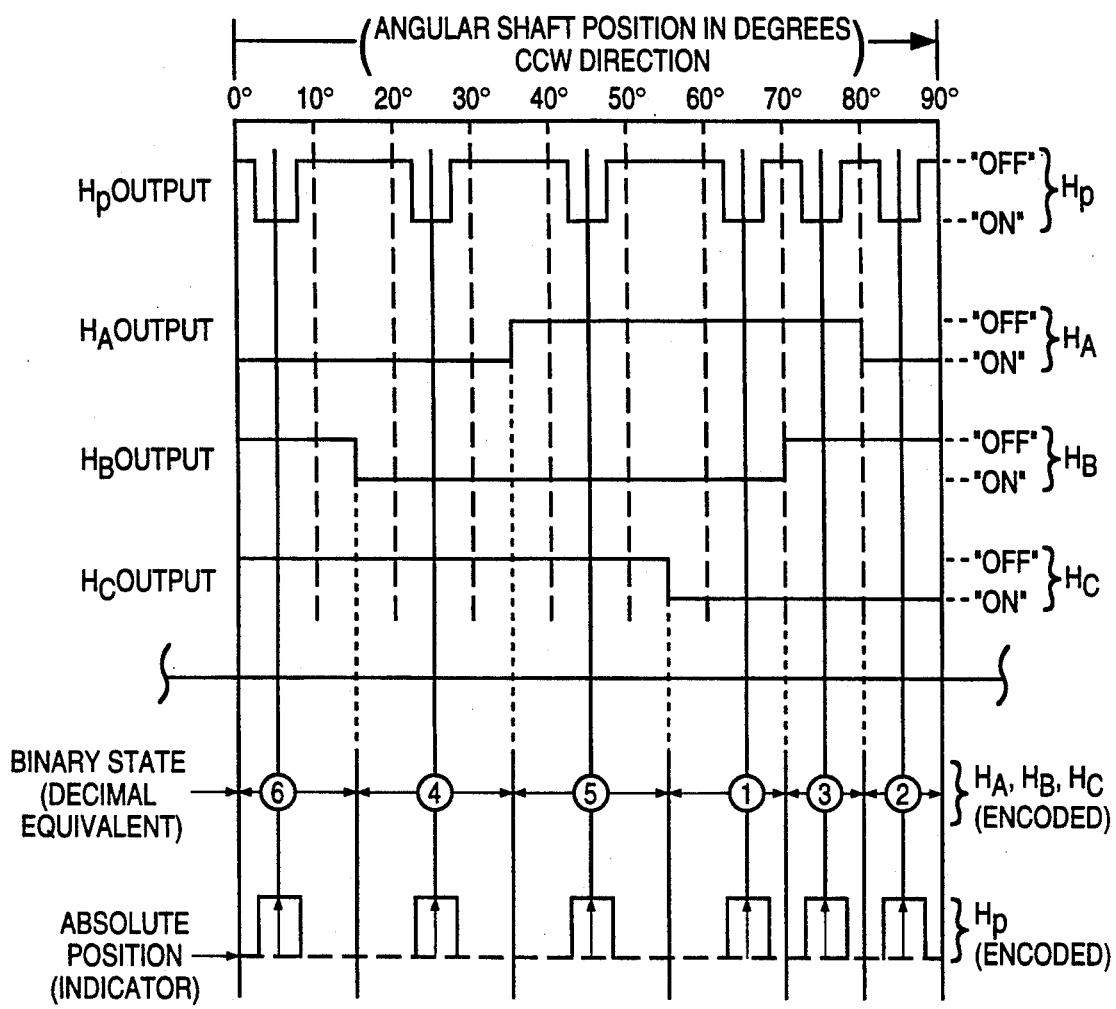
FIG. 5 illustrates a plot of the signals provided by individual Hall sensors as a particular composite magnet is rotated through a predetermined angle.

FIG. 5 graphically displays the digital signal outputs of each Hall sensor as composite magnet 72 is rotated counterclockwise through an angular distance of approximately 90°. Note that when shaft 70 of encoder 78 is actually coupled to the cam shaft (not shown) a relative 5° shift of composite magnet 72 occurs due to the housing in which the encoder 78 is mounted. Thus, in one embodiment, $H_p$ detects south pole 81 at 5°, not 0°.

South poles 82-88 are detected in a similar manner. These digital signal outputs are "read" by the controller electronics. In this manner, a relative mechanical shaft position is converted into electrical binary-encoded data signals to the system controller. Hall sensors $H_A$, $H_B$, and $H_C$ provide output signals which represent the least significant digit to the most significant digit. For example, at 45° the binary state provided by Hall sensors $H_A$, $H_B$, and $H_C$ is "101" (decimal equivalent five (5)). Each binary state corresponds to a particular cam position. In this embodiment, the decimal equivalents (1)-(6) represent the following gear positions: (1) neutral, (2) four-wheel low extended (an extended four-wheel position), (3) four-wheel low, (4) two-wheel high, (5) four-wheel high, and (6) two-wheel high extended.

As mentioned previously, the motor of this encoder application continues driving the cam shaft until a Hall sensor Hp is activated which indicates an absolute position. At this point, the system controller electronics detects the output signal from Hall sensor $H_p$ and executes the proper response command, i.e. "stop motor". This ensures that the cam is positioned in the proper detent for the desired gear shift position.

The available strength, i.e. the magnetomotive force potential, of the composite magnet, either in isolation or in a magnetic circuit, is affected by many factors. For example, if a composite magnet is isolated, the two main factors are material and geometry. Each material has its own internal energy product potential which is referred to as a BH product ($B_D H_D$). The geometry as it effects the magnetomotive force potential focuses primarily on a ratio of the length to cross-sectional area of the composite magnet. Specifically, the smaller the ratio, the less the potential energy available for external field strength. In contrast, if the composite magnet is incorporated into a magnetic circuit, the following factors should be considered. One factor is the ratio of two geometrical terms. The first term (as indicated above) is the length over the cross-sectional area of the composite magnet. The first term is bound in a relationship to the second term, wherein the second term is the effective length of the air gap to the effective cross-sectional area of the air gap. The air gap is the distance the magnetic flux travels through free space. The ratio of the first to the second term dominates the available external field strength in a closed magnetic circuit. For further information regarding various factors influencing the magnetic flux, see *Permanent Magnet Materials,* Supplement to Magnetic Materials Producers Association (MMPA) Standard No. 0100, 800 Custer Avenue, Evanston, Ill. 60202; *University Physics,* Part II, Third Edition, by F. W. Sears and M. W. Zemansky, Addison-Wesley Publishing Company, Ave., 1965; and *Electromagnetics,* Schaum's Outline Series by J. A. Edminister, McGraw - Hill Book Company, 1979 which are incorporated herein by reference. All of the preceding factors are interrelated, whereby modifying one factor may dramatically affect the performance results of the composite magnet. Because of the complexity of the interaction of the various factors, experimental testing should be used to optimize the desired performance goals of the composite magnet for any given application. Ultimately, the particular design of the composite magnet entails a tradeoff between required field strength and practicality, i.e. concerns regarding expense and ease of manufacture.

The above description is illustrative and not limiting. For example, although the above described composite magnet is incorporated into an absolute encoder, the composite magnet may also be used in an incremental encoder. Furthermore, although a single "track" of south poles is used in the above embodiment of the encoder, multiple tracks may also be used for other applications where each track provides a different function. Further modifications of the invention will be apparent to one of ordinary skill in the art in light of this disclosure and the claims.

I claim:

1. A magnetic encoder for detecting a movement or a position of an object comprising:
    a composite magnet for coupling to said object, said composite magnet including:
        a first piece of magnetized material having a projection thereon; and
        a second piece of magnetized material with an aperture formed therein, said first and second pieces being magnetized in opposite axial directions along a common axis such that after said projection on said first piece is mated to said aperture of said second piece, a pattern of north-south poles is formed on one surface of said composite magnet, said pattern determined by said aperture and said projection; and
    means for detecting a movement or a position of said composite magnet, wherein said means for detecting is placed in operative relation to said composite magnet.

2. The magnetic encoder of claim 1 wherein said composite magnet provides an absolute encoder.

3. The magnetic encoder of claim 1 further including a back-iron for creating a low reluctance magnetic circuit flux return path, said back-iron positioned in operative relation to said composite magnet.

4. The magnetic encoder of claim 3 wherein said means for detecting comprise Hall-effect sensors.

5. The magnetic encoder of claim 1 wherein said means for detecting comprises at least one sensor.

6. The magnetic encoder of claim 5 wherein said at least one sensor is positioned on a first support means.

7. The magnetic encoder of claim 6 further including a means for creating a low reluctance magnetic circuit flux return path, wherein said means for creating is positioned between said composite magnet and said first support means.

8. The magnetic encoder of claim 7 wherein said means for creating includes at least one aperture, wherein said at least one sensor on said first support means is positioned in said at least one aperture.

9. The magnetic encoder of claim 6 wherein said first support means includes a PC board.

10. The magnetic encoder of claim 6 further including a second support means for positioning said first support means and said composite magnet.

11. The magnetic encoder of claim 10 wherein said means for detecting further includes a shaft secured to said composite magnet.

12. The magnetic encoder of claim 11 wherein said first support means includes an opening, said shaft positioned to rotate freely in said opening.

13. The magnetic encoder of claim 12 wherein said second means includes a third means for supporting, said third means for supporting positioned to receive said shaft.

14. The magnetic encoder of claim 11 wherein said means for creating includes a back-iron.

15. The magnetic encoder of claim 14 wherein said back-iron is fabricated from a soft magnetic material.

16. The magnetic encoder of claim 3 where said back-iron is fabricated from a soft magnetic material.

17. A magnetic encoder for detecting a movement or a position of an object comprising:
a composite magnet for coupling to said object, said composite magnet comprising:
a first piece of magnetized material including a first projection and a first aperture; and
a second piece of magnetized material including a second projection and a second aperture, said first and second pieces of magnetized material being magnetized in opposite axial directions along a common axis such that after said first projection mates with said second aperture and said second projection mates with said first aperture a first pattern of north-south poles is formed on one surface of said composite magnet, said first pattern determined by said first projection and said second aperture, and a second pattern of north-south poles is formed on another surface of said composite magnet, said second pattern determined by said second projection and said first aperture; and
means for detecting a movement or a position of said composite magnet, wherein said means for detecting is placed in operative relation to said composite magnet.

18. The magnetic encoder of claim 17 wherein said composite magnet provides an absolute encoder.

19. The magnetic encoder of claim 17 wherein said means for detecting comprise Hall-effect sensors.

20. The magnetic encoder of claim 17 wherein said means for detecting comprises at least one sensor.

21. The magnetic encoder of claim 20 wherein said at least one sensor is positioned on a first support means.

22. The magnetic encoder of claim 21 further including a means for creating a low reluctance magnetic circuit flux return, wherein said means for creating is positioned between said composite magnet and said first support means.

23. The magnetic encoder of claim 22 wherein said means for creating includes at least one aperture, wherein said at least one sensor on said first support means is positioned in said at least one aperture.

24. The magnetic encoder of claim 20 wherein said first support means includes a PC board.

25. The magnetic encoder of claim 21 further including a second support means for positioning said first support means, said means for creating, and said composite magnet.

26. The magnetic encoder of claim 25 wherein said means for detecting further includes a shaft secured to said composite magnet.

27. The magnetic encoder of claim 26 wherein said first support means includes an opening, said shaft positioned to rotate freely in said opening.

28. The magnetic encoder of claim 17 wherein said second means includes a third means for supporting, said third means for supporting positioned to receive said shaft.

29. The magnetic encoder of claim 22 wherein said means for creating includes a back-iron.

30. The magnetic encoder of claim 29 wherein said back-iron is fabricated from a soft magnetic material.

31. The magnetic encoder of claim 17 further including a back-iron for creating a low reluctance magnetic circuit flux return path, said back-iron positioned in operative relation to said composite magnet.

32. The magnetic encoder of claim 31 wherein said back-iron is fabricated from a soft magnetic material.

* * * * *